United States Patent Office 3,536,473
Patented Oct. 27, 1970

3,536,473
METHOD FOR REGULATING PLANT GROWTH WITH A HALOGENATED DERIVATIVE OF THIOPHENECARBOXYLIC ACID
Ivan Christoff Popoff, Ambler, Harold James Miller, Newtown Square, and Gopal Hari Singhal, King of Prussia, Pa., assignors to Pennwalt Corporation, a corporation of Pennsylvania
No Drawing. Filed June 15, 1967, Ser. No. 646,196
Int. Cl. A01n 9/12
U.S. Cl. 71—90          7 Claims

ABSTRACT OF THE DISCLOSURE

Plants, plant parts, or their habitats are treated with a plant growth regulating amount of a halogenated thiophenecarboxylic acid of the formula

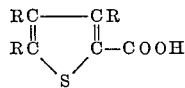

where R is hydrogen, chlorine, bromine, fluorine, $NO_2$, CN, OR', SR', COOR', C(O)R', $NR'_2$, and $C(O)NR'_2$, wherein R' is hydrogen or alkyl having one to 12 carbon atoms, at least one of the R substituents being chlorine, bromine or fluorine; or a derivative of said acid which can be converted to the free acid by hydrolysis; or a metallic or ammonium salt of said acid.

---

This invention is concerned with the alteration or modification of the growth of vegetation and is particularly concerned with the suppression and regulation of the growth of vegetation and with compositions and methods for the control of the growth of germinant seeds, emerging seedlings, and established plants of many species.

According to the present invention, it has been discovered that the growth of plants can be altered or modified by exposing plants and plant parts to the action of, or by treating plants and plant parts and their habitats with a halogenated thiophenecarboxylic acid or a hydrolyzable derivative of said acid. More specifically, the plant growth regulating compounds used in the present process are represented by a halogenated thiophenecarboxylic acid having the structure

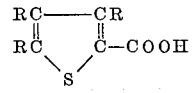

where each R substituent is independently selected from the group consisting of hydrogen, chlorine, bromine, fluorine, $NO_2$, CN, SR', OR',

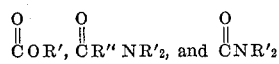

wherein R' is hydrogen or alkyl having one to 12 carbon atoms, with the proviso that least one of the R substituents is chlorine, bromine or fluorine; or a hydrolyzable derivatives of said halogenated thiophenecarboxylic acid which can be converted to the free acid through hydrolysis involving one molecule of water; or an ammonium or metallic salt of said halogenated thiophenecarboxylic acid which can be converted to the free acid through acid-induced hydrolysis, i.e., reaction with an acid in aqueous media. The halogenated thiophenecarboxylic acids are known compounds and their hydrolyzable derivatives and salts may be prepared from the free acids by preparative methods involving condensation reactions well known in the art. Thus, the compounds used as plant growth regulators according to this invention may also be represented by the following general formula

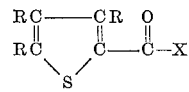

where R is defined above and X is a member of the group of chemical substituents selected from the class consisting of the hydroxyl radical (in which event the compound is an acid); fluorine or chlorine (in which event the compound is an acid halide); an oxy hydrocarbon radical (in which event the compound is an ester); an amino radical or a hydrocarbon substituted amino radical (in which event the compound is an amide); and an oxy ammonium or oxy metallic group (in which event the compound is a salt). Representative esters of the acids embodied herein are, for example, such alkyl esters as the methyl, ethyl, n-propyl, isopropyl, n-butyl, isobutyl, amyl, hexyl and the like containing up to about 18 carbon atoms in the alkyl moiety; such aryl esters as the phenyl, naphthyl, tolyl esters and the like; such amides as the mono- and dimethyl amides, mono- and diethyl amides, mono- and diisobutyl amides, benzyl amides, octadecylamide, dodecylamide, and like amides having up to about 18 carbon atoms in the amine moiety. Representative salts are, for example, the ammonium and metallic salts of the acids, especially the sodium potassium, magnesium, zinc, and iron salts.

The method of the present invention is carried out by applying an effective amount of the above-described halogenated thiophenecarboxylic acid or derivative to plants, plant parts or their habitats. The plant response agents are generally formulated for application to the plants or soil as dispersions in water or as dispersions or solutions in organic solvents, or in the case of the ammonium or metallic salts of the acid, as water solutions. In preparing the dispersions, a suitable wetting agent may be added which aids in the preparation of the formulation and which also serves to help penetration of the compound into the plant and soil surfaces. Suitable water dispersion concentrates may be prepared with or without suspending agents by ball milling or other fine grinding techniques. Suspending agents may be selected from such agents readily available as lignin sulfonates, bentonite, and solutions of Methocel and the like. Formulations may also be prepared as emulsion concentrates for dilution with water for field applications. These may be prepared by the use of suitable solvents such as xylene, heavy aromatic naphtha, isophorone, benzene, heptane, heavy mineral oils, kerosene and other solvents immiscible with water, with the addition of a suitable anionic, cationic or non-ionic emulsifying agent such as long-chain alkyl benzene sulfonates or polyglycol ethers. In lieu of said dispersion, or emulsion in water, or oil-in-water emulsion, the compounds can be prepared and applied merely as solution in an organic solvent such as those solvents mentioned above, or in such water-miscible solvents as diacetone alcohol, acetone, dimethyl sulfoxide, dimethyl formamide, phosphoric acid esters, etc. The latter solutions can also be diluted with water to the desired concentrations. The compounds may also be applied as formulations of wettable powders which are prepared by direct grinding of the compound in solid form with a blend of suitable carrying agent such as attapulgite, bentonite, kieselguhr, gypsum, etc. It is desirable to grind such a blend in a hammer mill so that 99% will pass through a 325 mesh screen. Wettable powders may also be prepared by absorbing a solution of the compound in a solvent such as xylene or acetone on a powdered or granular clay such as attapulgite or diatomaceous earth. All wettable powder preparations may contain a dispersing agent such as lignin sulfonate and a wetting agent such as an alkylaryl polyether glycol. In general, the concentration of the plant response agent will range from about 0.01% to about 25% by weight of the total formulation, i.e., of the combined weight of the plant response agent and the carrier medium, whether liquid or/and powder.

In accordance with the present invention, growth altering or phytotoxic amounts of the halogenated thiophenecarboxylic acid or its derivative may be dispersed on or in the soil or growth media in any convenient fashion. Applications to growth media can be carried out by simply mixing with the media, by applying to the surface of soil and thereafter dragging or discing into the soil to the desired depth, or by employing an aforementioned liquid carrier to accomplish the penetration and impregnation. The application of sprayable liquid and dust compositions to the surface of soil, or to plant parts, or the above-ground surfaces of plants can be carried out by conventional methods, e.g., power sprayers, hand sprayers and spray dusters, whether surface or airborne.

The compounds embodied in this invention are particularly useful and show marked efficiency in the growth inhibition of, for example, vegetable crops such as tomatoes and beans, root crops such as beets, potatoes and carrots, fiber crops such as cotton and flax, ornamental flower crops such as lilies and chrysanthemums, ornamental woody plants such as privet and cherry laurel, and agronomic crops such as sugar cane and corn. The compounds are especially useful for cotton regrowth control wherein the formulation, diluted in an oil or water carrier, is sprayed, preferably at a rate of about 2 to 5 pounds per acre, on the cotton plants immediately before or at the time of application of a defoliant or desiccant just before picking the lint. Objectionable regrowth of the cotton plant is thereby prevented. The compounds are also useful in pre-emergent weed control applications with regard to preventing the emergence of both broad leaf weeds and grass type weeds. The amounts at which the plant response agents embodied herein may be used for the above purposes can vary from about 0.5 to about 10 pounds per acre. However, in general, the preferred amounts for growth inhibition applications are at rates of from about 1 to about 5 pounds per acre, and when used as herbicides the phytotoxic amounts, in general, are preferred to be from about 2 to about 8 pounds per acre. The compounds embodied in this invention have also been found useful in applications to beets for the increase of root growth wherein the treatment is made at the time the beet plant begins enlargement of the roots to form tubers. Such use of the agents has resulted in a significant increase in the yield of the harvest beet tubers.

The examples that follow are set forth to illustrate the method of this invention and are not meant to limit the scope thereof.

PLANT GROWTH EFFECT EVALUATIONS

Representative compounds embodied in this invention were evaluated for plant response properties using the following representative plants and techniques. Performance of the agents was evaluated on cotton plants by diluting the formulated material in the equivalent of 100 gal./acre of water as a carrier and spraying six months-old, actively growing cotton plants in pots in a greenhouse. Observations on growth inhibition were made after three weeks by counting the number of leaves developing beyond the mark made at the end of the stem at time of treatment. Trifoliate growth inhibition and plant kill characteristics were evaluated on actively growing, two week-old Black Valentine bean plants with two fully-grown paired leaves and immature trifoliate leaves. The formulated agent was diluted in the equivalent of 100 gal./acre of water as a carrier or the equivalent of 10 gal./acre of a non-phytotoxic "Superior" oil and sprayed on the plants in pots in a greenhouse. Observations on resulting trifoliate growth inhibition were made after three weeks by measuring the height of the plants and comparing their growth with untreated control plants. Pre-emergent herbicidal evaluations were carried out by planting the representative crop seeds and representative weed seeds in the soil at the same time. The plant response agent formulation was sprayed on the surface of the soil immediately after seeding. The extent of the preemergent herbicidal activity and the crop tolerance to the plant response agent were noted after approximately one month of optimum greenhouse growing conditions.

EXAMPLE 1

2,3-dibromo-5-thiophenecarboxylic acid (prepared according to the procedures of W. Steinkopf, H. Jacob, and H. Penz. Ann. 512, 136 (1934)) was formulated as follows:

|  | Percent by wt. |
|---|---|
| Plant response agent | 10 |
| Xylene | 65 |
| Dimethyl sulfoxide | 20 |
| Emulsifier [1] | 5 |

[1] Blend of alkylaryl polyether alcohols with organic sulfonates ("Triton X–155").

The formulated material was diluted with water to form an aqueous dispersion for the plant response evaluations. In the cotton plant treatments, at an application rate of one lb./acre, an average of 9 small leaves was noted on the treated plants after three weeks, compared with an average of twelve leaves on untreated control plants. The trifoliate growth inhibition was 90% at a rate of 1.0 lb./acre. Plant kill was 100% at 10.0 lbs./acre in 14 days. Essentially equal activity as described above was observed for the 2,3-dibromo-5-thiophenecraboxylic acid using the foregoing formulation with a nonphytotoxic oil as a carrier.

The sodium salt of 2,3-dibromo-5-thiophenecarboxylic acid was evaluated using a 5% aqueous solution of the compound. Trifoliate growth inhibition was 50%, 90% and 100% at application rates, respectively, of 0.1, 1.0 and 10.0 lbs./acre.

EXAMPLE 2

2,3-dichloro-5-thiophenecarboxylic acid (prepared according to the method of W. Steinkopf and W. Kohler, Ann. 532, 250 (1937)) was evaluated using the formulation described in Example 1 and a water carrier. In the cotton plant tests, at an application rate of one lb./acre, an average of five small leaves was observed on treated plants after three weeks, compared with an average of twelve leaves on untreated control plants. Trifoliate growth inhibition was also 100% at rates of 0.1 and 1.0 lb./acre. Trifoliate growth inhibition was also 100% at rates of 0.1, 1.0 and 10.0 lbs./acre using the formulation described in Example 1 and a non-phytotoxic oil carrier ("Superior oil").

The sodium salt of 2,3-dichloro-5-thiophenecarboxylic acid applied as a 5% aqueous solution gave trifoliate growth inhibition of 90% and 100% at rates of 1.0 and 10.0 lbs./acre, respectively.

2,3-dichloro-5-thiophenecarboxylic acid was evaluated for preemergent herbicidal activity with respect to the crops of alfalfa, radish, cotton and peanuts, and various weeds and grasses as specified below. The rate of application of the herbicide was 4 lbs./acre using the following formulation which was diluted in about 10 gallons of water per acre.

|  | Percent by wt. |
|---|---|
| Plant response agent | 10 |
| Diacetone alcohol | 35 |
| Xylene | 35 |
| Emulsifier ("Triton X–155") | 20 |

The tolerance of the foregoing crops to the pre-emergent herbicide was essentially 100%, i.e., substantially all of the crop seeds developed as uninjured plants. However, the control of the weeds was excellent as the plant response agent prevented substantial emergence of the weed plants; specifically, effective controls of the weeds were lambsquarter, 97%; aramanthus, 80–100%; crabgrass, 70%; and morning glory, 90%.

EXAMPLE 3

5-chloro-2-thiophenecarboxylic acid (procedure for its synthesis described by Bunnett et al., J. Am. Chem. Soc., 71, 1493 (1949)) was evaluated using the formulations described in Example 1. Trifoliate growth inhibition was 50% and 100% at rates of 1.0 and 10 lbs./acre, respectively, for both water and oil diluted formulations.

EXAMPLE 4

2,3,4-trichloro-5-thiophenecarboxylic acid applied as the formulation of Example 1 with a water carrier at rates of 1.0 and 10 lbs./acre, respectively, produced 90% and 100% trifoliate growth inhibition.

We claim:
1. The method which comprises applying to plants and plant parts and their habitats a growth inhibiting amount of a compound selected from the group consisting of a halogenated thiophene carboxylic acid having the formula

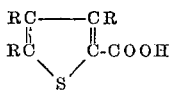

and the ammonium, sodium and potassium salts of said acid where each R substituent is independently selected from the group consisting of hydrogen, chlorine, bromine and fluorine, at least one of said R substituents being chlorine, bromine, or fluorine.

2. The method of claim 1 wherein the compound is 2,3-dibromo-5-thiophenecarboxylic acid.

3. The method of claim 1 wherein the compound is the sodium salt of 2,3-dibromo-5-thiophenecarboxylic acid.

4. The method of claim 1 wherein the compound is 2,3-dichloro-5-thiophenecarboxylic acid.

5. The method of claim 1 wherein the compound is the sodium salt of 2,3-dichloro-5-thiophenecarboxylic acid.

6. The method of claim 1 wherein the compound is 5-chloro-2-thiophenecarboxylic acid.

7. The method of claim 1 wherein the compound is 2,3,4-trichloro-5-thiophenecarboxylic acid.

References Cited

UNITED STATES PATENTS 3,050,442  8/1962  Bijloo et al. _____ 71—90 X

JAMES O. THOMAS, JR., Primary Examiner

U.S. Cl. X.R.

71—73